United States Patent
Wissner-Gross et al.

(10) Patent No.: US 8,073,864 B2
(45) Date of Patent: Dec. 6, 2011

(54) METHOD AND APPARATUS FOR HUMAN-POWERED MOBILE VISUAL SEARCH AND FEEDBACK

(75) Inventors: Alexander David Wissner-Gross, Cambridge, MA (US); Timothy Michael Sullivan, Cambridge, MA (US)

(73) Assignee: Institute for Sustainable Communication, New York, NY (US)

( * ) Notice: Subject to any disclaimer, the term of this patent is extended or adjusted under 35 U.S.C. 154(b) by 365 days.

(21) Appl. No.: 12/187,516

(22) Filed: Aug. 7, 2008

(65) Prior Publication Data

US 2009/0049100 A1  Feb. 19, 2009

Related U.S. Application Data

(60) Provisional application No. 60/955,995, filed on Aug. 15, 2007.

(51) Int. Cl.
*G06F 17/30* (2006.01)
*G06F 7/00* (2006.01)

(52) U.S. Cl. ......... 707/769; 707/722; 707/913; 707/917

(58) Field of Classification Search .......................... None
See application file for complete search history.

(56) References Cited

U.S. PATENT DOCUMENTS

| | | | |
|---|---|---|---|
| 6,826,540 B1 * | 11/2004 | Plantec et al. | 705/7.32 |
| 6,898,631 B1 * | 5/2005 | Kraft et al. | 709/224 |
| 7,751,805 B2 * | 7/2010 | Neven et al. | 455/414.3 |
| 7,788,248 B2 * | 8/2010 | Forstall et al. | 707/706 |
| 2007/0123280 A1 * | 5/2007 | McGary et al. | 455/466 |
| 2007/0179834 A1 * | 8/2007 | Carter et al. | 705/10 |

* cited by examiner

*Primary Examiner* — Greta Robinson
*Assistant Examiner* — James J Wilcox
(74) *Attorney, Agent, or Firm* — Mark S. Leonardo; Lillian R. Horwitz; Brown Rudnick LLP

(57) ABSTRACT

A system and a method for receiving live human feedback of an image provided using a mobile device equipped with a camera. The method includes capturing an image with the mobile device equipped with a camera, inputting a text query, where the text query corresponds with the image, transmitting the image and the text query to a server, determining at least one client user to send the image and the text query to, sending the image and the text query from the server to the at least one client user, reviewing the image and the text query, formulating at least one text response relating to the image and the text query, accepting the at least one text response from the at least one client user, and outputting the at least one text response to a user.

8 Claims, 2 Drawing Sheets

METHOD AND APPARATUS FOR HUMAN-POWERED MOBILE VISUAL SEARCH AND FEEDBACK

CROSS-REFERENCE TO RELATED APPLICATIONS

This patent application claims priority to U.S. Provisional Application Ser. No. 60/955,995, filed in the U.S. Patent and Trademark Office on Aug. 15, 2007 by Wissner-Gross et al., the entire contents of this application being incorporated herein by reference in its entirety.

BACKGROUND

1. Technical Field

The present disclosure relates to a method and a system for providing various services using photos taken with a camera phone. In particular, the present disclosure is directed to a method and a system for providing data and feedback, back and forth between a user and another set of at least one client user, using photos taken with a camera phone.

2. Description of the Related Art

Mobile telephones have advanced significantly over the past two decades. In addition to mobile telephones having the capability to make wireless telephone calls, they also now have, for example, a game function, a transmitting function and a camera function. The camera function further allows a user to take a photograph and then send the photograph to other mobile phones and electronic mail accounts. However, the process of sending a photograph is not a process by which a receiver of the image can immediately send live feedback in just an instant.

SUMMARY

In an embodiment of the present disclosure, a method for receiving live human feedback of an image provided using a mobile device equipped with a camera is presented. The method includes capturing an image with a mobile device equipped with a camera and inputting a text query the text query corresponds with the image. The method also includes transmitting the image data and the text query to a server, determining at least one client user to send the image and the text query to, and sending the image and the text query from the server to the at least one client user. Further, the method includes reviewing the image and the text query, formulating at least one text response relating to the image and the text query, accepting the at least one text response from the at least one client user, and outputting the at least one text response.

In another embodiment of the present disclosure, a system for receiving live human feedback of an image data provided using a mobile device equipped with a camera is presented. The system includes a mobile device equipped with a camera, a captured image, a text query corresponding to the captured image, a wireless network, a server to receive the captured image and the text query through the wireless network, a processor to determine at least one client user to send the captured image and the text query to, and at least one client user to provide a text response to a user, through the server, through the wireless network.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages, may be best understood by reference to the following description, taken in connection with the accompanying drawings as set forth below:

DETAILED DESCRIPTION OF EXEMPLARY EMBODIMENTS

The following detailed description refers to the accompanying drawings. The same reference numbers in different drawings may identify the same or similar elements. In addition, the following detailed description does not limit the present disclosure.

Figure 1:
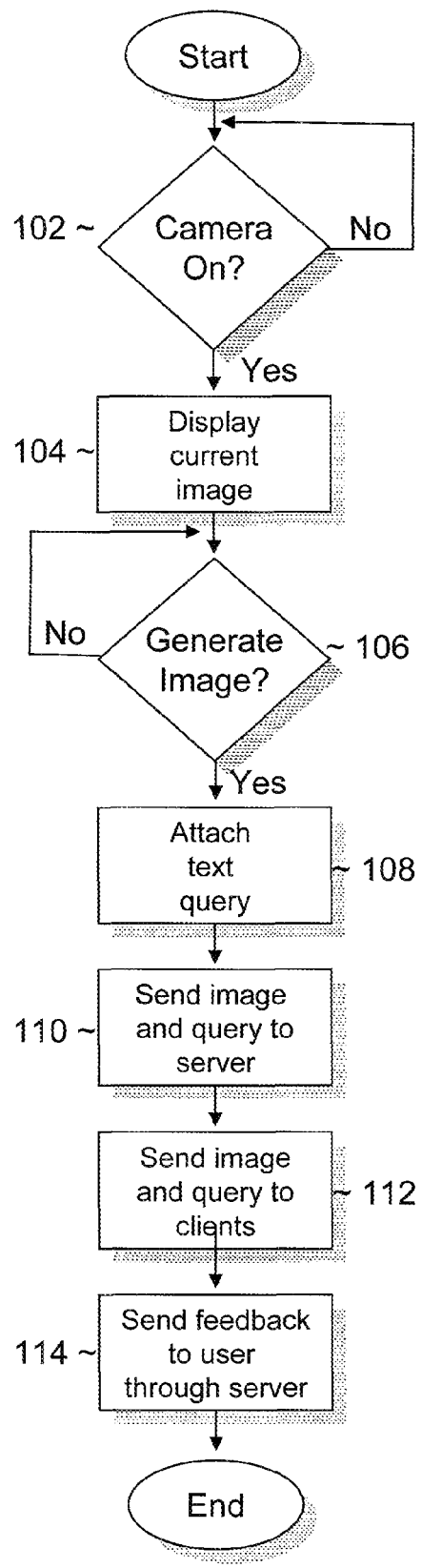
FIG. 1 illustrates a flowchart of the method of sending an image to a client to receive feedback on the image, according to an embodiment of the present disclosure.

FIG. 1 illustrates a flowchart of the method of sending an image to a client to receive feedback on the image, according to an embodiment of the present disclosure.

Referring to FIG. 1, the first thing to check is whether or not a camera shooting mode on the camera phone is set to "on", in step 102. If the camera shooting mode is set to "on", the current image of the location which the user wants to shoot is displayed on the display section of the camera phone, in step 104. If the user wants to generate the image into a photograph, at step 106, then the image is taken and stored. The user, at step 108, then has an option to add a text query, such as a subject or a body of the message to correspond to the image captured. At step 110, the image and optional text query are sent to a server through a wireless network. The server sends the image and the optional query, in step 112, to client users, for example, visitors to a website. Then, at step 114, textual responses from the client users are sent to the server and the server forwards the responses back to the camera phone user, in step 114. Therefore, the camera phone user is receiving live human answers and feedback in response to mobile visual queries.

Figure 2:
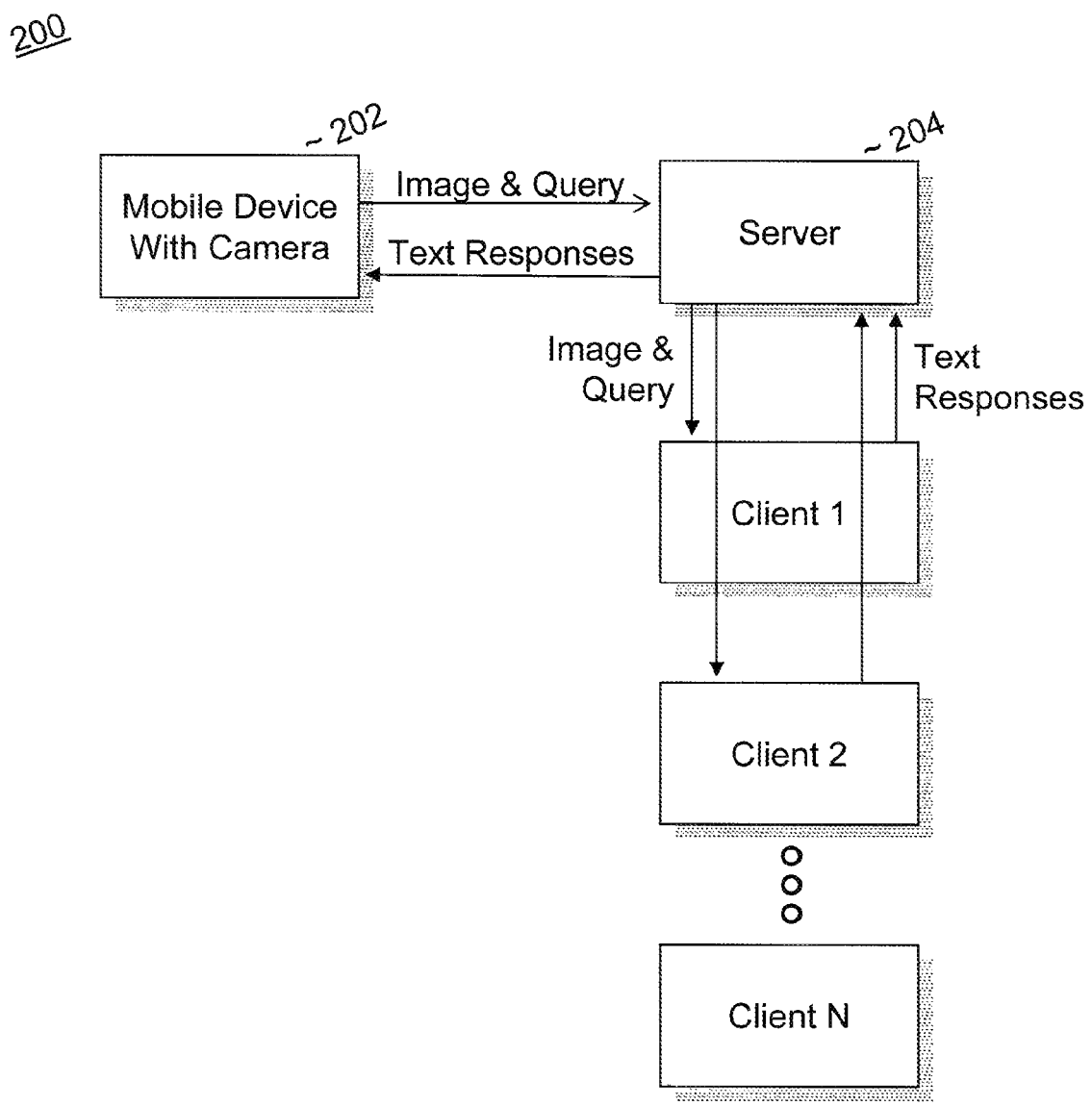
FIG. 2 is an outlined diagram showing a system of a camera phone user generating and sending an image to a server and client users for live human feedback.

FIG. 2 is an outlined diagram showing a system of a camera phone user generating and sending an image to a server and client users for live human feedback.

Referring to FIG. 2, the system 200 includes a mobile device 202, a server 204, at least one client 206a, 206b, etc., and a wireless network (not shown). The mobile device 202 may be a mobile cellular telephone with a camera feature.

The mobile device with a camera 202 may shoot an object to be captured through a camera lens and then converts the image to a digital photograph that is transmitted through a wireless network.

Once an image is captured on the mobile device 202 and converted to a digital image, and a text query is entered on the same mobile device 202, the image and the text query are sent to the server 204. The server 204 acts as a gateway between (a) a user capturing the image and entering the text query; and (b) the client user who reviews the image and text query and responds with feedback, comments and/or advice. The server 204 also determines which client users to send the image and text query to, how many of them to send it to, and how many responses to accept.

The present disclosure may be especially helpful for, among others, several applications. For example, a user may be shopping and would like to determine if the price that they are getting is reasonable. Therefore, a user may take a photograph, using his camera phone, of a television. The text query may include the television size, make and model. Once the image and the text query are passed through the server, the feedback received by the user may include prices for comparable products to those photographed. Therefore, the present disclosure may be used for comparison shopping.

Another example of using the present disclosure is if a user is in an unfamiliar area and is lost. The user may use an embodiment of the present disclosure to obtain directions and/or a map.

The following is a list of other areas in which the method and system of the present disclosure may be used:

- To assess the reliability of products being considered for purchase by those who have used them;
- To obtain advice and directions what will help in the assembly of purchases;
- To focus test products;
- To get advice in social situations, such as on a date;
- To get opinions on personal physical and other appearances;
- To find out where to purchase products that are photographed but for which origins are known to the photographer;
- To find out if food is healthful or to assess how many calories are in a particular food; and
- To get help with homework and other problems of an intellectual nature.

No element, act, or instruction used in the present application should be construed as critical or essential to the present disclosure unless explicitly described as such. In addition, as used herein, the article "a" is intended to include one or more items. Where only one item is intended, the term "one" or similar language is used.

It will be understood that various modifications may be made to the embodiments disclosed herein. Therefore, the above description should not be construed as limiting, but merely as exemplifications of the various embodiments of the present disclosure. Those skilled in the art will envision other modifications within the scope and spirit of the claims appended hereto.

What is claimed is:

1. A method for receiving live human feedback of an image provided using a mobile device equipped with a camera, the method comprising the steps of:
    capturing an image with a mobile device equipped with a camera;
    inputting a text query, the text query corresponding to the image;
    transmitting the image and the text query to a server;
    determining at least one interactive website to send the image and the text query to; and
    sending the image and the text query from the server to the at least one interactive website; wherein at least one visitor to the interactive website:
    reviews the image and the text query;
    formulates at least one text response including advice relating to the image and the text query; and
    sends the at least one text response to the server via the interactive website; and wherein the server
    filters the at least one text response then outputs the at least one text response to the mobile device capturing the image.

2. The method of claim 1, wherein only a limited number of visitors to the at least one interactive website may send the at least one text response to the server.

3. The method of claim 1, wherein the mobile device is a mobile cellular telephone.

4. The method of claim 1, wherein the text response includes text and/or graphics.

5. A system for receiving live human feedback of an image provided using a mobile device equipped with a camera, the system comprising:
    a mobile device equipped with a camera;
    an image captured using the mobile device;
    a text query corresponding to the captured image, the text query input on the mobile device;
    a wireless network;
    a server to receive the captured image and the text query transmitted from the mobile device through the wireless network;
    a processor to determine at least one interactive website to send the captured image and the text query to; and
    at least one visitor to the interactive website to provide a text response including advice relating to the image and the text query to the server via the interactive website, the server to filter the at least one text response then output the at least one text response to a user, via the wireless network.

6. The system of claim 5, wherein the mobile device is a mobile cellular telephone.

7. The system of claim 5, wherein only a limited number of visitors to the at least one interactive website may send the at least one text response to the server.

8. The system of claim 5, wherein the text response includes text and/or graphics.

* * * * *